(12) United States Patent
Joi et al.

(10) Patent No.: US 10,387,471 B2
(45) Date of Patent: Aug. 20, 2019

(54) UNSTRUCTURED RESPONSE EXTRACTION

(71) Applicant: Workplace Dynamics, LLC, Exton, PA (US)

(72) Inventors: Richard Johnson Joi, Lancaster, PA (US); Clifford Robert Bettmann Piontek, Wynnewood, PA (US)

(73) Assignee: Energage, LLC

( * ) Notice: Subject to any disclaimer, the term of this patent is extended or adjusted under 35 U.S.C. 154(b) by 382 days.

(21) Appl. No.: 15/223,203

(22) Filed: Jul. 29, 2016

(65) Prior Publication Data

US 2017/0032028 A1 Feb. 2, 2017

Related U.S. Application Data

(60) Provisional application No. 62/198,811, filed on Jul. 30, 2015.

(51) Int. Cl.
  *G06F 16/35* (2019.01)
  *G06F 16/338* (2019.01)

(52) U.S. Cl.
  CPC ............ *G06F 16/35* (2019.01); *G06F 16/338* (2019.01)

(58) Field of Classification Search
  CPC ......... G06F 17/30705; G06F 17/30696; G06F 16/35; G06F 16/338
  USPC ...................................................... 707/758
  See application file for complete search history.

(56) References Cited

U.S. PATENT DOCUMENTS

| | | | |
|---|---|---|---|
| 5,930,803 A | 7/1999 | Becker et al. | |
| 6,041,331 A | 3/2000 | Weiner et al. | |
| 6,078,924 A | 6/2000 | Ainsbury et al. | |
| 7,730,085 B2 | 6/2010 | Hassan et al. | |
| 8,281,238 B2 | 10/2012 | Sweeney et al. | |
| 8,402,030 B1 | 3/2013 | Pyle et al. | |
| 8,577,884 B2 | 11/2013 | Poteet et al. | |
| 8,676,795 B1 * | 3/2014 | Durgin ................ | G06F 17/2715 707/730 |
| 9,659,084 B1 * | 5/2017 | Zhang ................. | G06F 3/04842 |

(Continued)

FOREIGN PATENT DOCUMENTS

CN 103778213 5/2014

OTHER PUBLICATIONS https://www.mu-sigma.com/our-musings?type%255B%255D=11.

(Continued)

*Primary Examiner* — Evan Aspinwall
(74) *Attorney, Agent, or Firm* — The Belles Group, P.C.

(57) ABSTRACT

In one embodiment, the invention can be a method for assessing unstructured comments, the method including providing reference data generated from a first set of unstructured comments from a first group; receiving a second set of unstructured comments from a second group; identifying a significant word within each unstructured comment of the second set of unstructured comments; for each significant word identified within the second set of unstructured comments, determining a frequency of occurrence of the significant word; and generating a visualization including a portion of the identified significant words, wherein for each visualized significant word, a first aspect of an appearance of the significant word is based on an extent to which the frequency of occurrence deviates from a frequency of occurrence of the significant word in the first set of unstructured comments.

28 Claims, 8 Drawing Sheets

(56) References Cited

U.S. PATENT DOCUMENTS

| | | | |
|---|---|---|---|
| 2009/0129596 A1* | 5/2009 | Chavez | G06F 17/241 380/277 |
| 2009/0287642 A1* | 11/2009 | Poteet | G06Q 30/02 |
| 2011/0270826 A1* | 11/2011 | Cha | G06F 17/30011 707/723 |
| 2012/0260201 A1 | 10/2012 | Ganesh et al. | |
| 2013/0018900 A1* | 1/2013 | Cheng | G06F 7/00 707/755 |
| 2013/0024241 A1 | 1/2013 | Papas et al. | |
| 2013/0212087 A1* | 8/2013 | Chitiveli | G06F 17/30991 707/722 |
| 2014/0282244 A1 | 9/2014 | Speer et al. | |
| 2014/0289213 A1* | 9/2014 | Delano | G06F 17/30696 707/706 |
| 2014/0310062 A1 | 10/2014 | Klein et al. | |
| 2015/0012288 A1 | 1/2015 | Riley et al. | |
| 2015/0161686 A1 | 6/2015 | Williams et al. | |

OTHER PUBLICATIONS http://www.isssolutions.com/downloads/ISS_Company_Culture.pdf.
http://www.business2community.com/strategy/one-word-can-speak-volumes-about-your-company-culture-01239905#5SBXXYvQ15q12PFk.97.
http://www.megaputer.com/down/textanalyst_whitepaper.pdf.

* cited by examiner

UNSTRUCTURED RESPONSE EXTRACTION

CROSS REFERENCE TO RELATED APPLICATIONS

The present application claims the benefit of U.S. Provisional Patent Application No. 62/198,811 filed on Jul. 30, 2015, which is incorporated herein by reference.

BACKGROUND

Questions asked of a population can be considered structured or unstructured. Structured questions have a fixed number of predefined answers. Common examples include multiple choice questions and Likert statements. Structured questions are valuable because they allow for easy quantification and comparison. For example, the responses from one population can easily be compared to a benchmark (e.g., a broader population, a different but similar population, or the same population at a different time). Comparing to a benchmark allows for interesting questions to be answered, such as whether the population is "better" or "worse" than expected, how the population has improved or declined, and more generally, how the population is different from a comparable population.

Unstructured questions are questions where people are not limited to a fixed number of predefined answers, but can type their own text response. Unstructured questions are valuable because they provide more detailed information and unexpected and important answers, including answers not completely related to the associated question.

Because structured and unstructured questions have different strengths, they are sometimes combined in a hybrid approach. There are two ways of doing this. The first hybrid approach is to ask both a structured question and an unstructured question together. For example, an employee might be asked how appreciated they feel on a scale of 1 to 10 and then be asked why they chose the number that they chose. The second hybrid approach is to use answers to an unstructured question as input to a structured question. For example, a group of people can be asked where they want to go to lunch and also to rate the options provided by others in the group.

An existing problem with the responses from unstructured questions is that they are very time consuming to read and very hard to interpret. The existing hybrid approaches help to focus attention on a smaller number of unstructured responses, but much information is lost in ignoring the other responses. This problem is especially pronounced when the number of unstructured responses is very large.

There are a number of different text mining techniques that have attempted to address this problem, but none are particularly satisfactory, especially where there is value in comparing mutually exclusive populations to each other. In a similar manner, there is a general need for assessing discrete units of text (such as articles and books), and especially for comparing different sets of discrete units of text in an efficient manner.

BRIEF SUMMARY

The present disclosure is directed to a method and system for assessing unstructured comments or text. In one aspect, a method includes providing reference data generated from a first set of unstructured comments from a first group; receiving a second set of unstructured comments from a second group, the second group being different from the first group; identifying a significant word within each unstructured comment of the second set of unstructured comments; for each significant word identified within the second set of unstructured comments, determining a frequency of occurrence of the significant word within the second set of unstructured comments; generating a visualization on a graphical user interface, the visualization including a portion of the identified significant words of the second set of unstructured comments, wherein for each visualized significant word of the second set of unstructured comments, a first aspect of an appearance of the significant word is based on an extent to which the frequency of occurrence of the significant word in the second set of unstructured comments deviates from a frequency of occurrence of the significant word in the first set of unstructured comments; and for each visualized significant word of the second set of unstructured comments, upon a user selecting the significant word from the graphical user interface, displaying additional data regarding the significant word.

In another aspect, a method includes providing reference data generated from a first set of discrete units of text; receiving a second set of discrete units of text; identifying a significant word within each discrete unit of text of the second set of unstructured comments; for each significant word identified within the second set of discrete units of text, determining a frequency of occurrence of the significant word within the second set of discrete units of text; generating a visualization including a portion of the visualized significant words of the second set of discrete units of text; wherein for each visualized significant word of the second set of discrete units of text, a first aspect of an appearance of the significant word is based on an extent to which the frequency of occurrence of the significant word in the second set of discrete units of text deviates from the frequency of occurrence of the significant word in the first set of discrete units of text.

In yet another aspect, a system for displaying unstructured comments includes a user interface; a server configured to perform the steps of receiving reference data generated from a first set of unstructured comments from a first group; receiving a second set of unstructured comments from a second group, the second group being different from the first group; identifying a significant word within each unstructured comment of the second set of unstructured comments; for each significant word identified within the second set of unstructured comments, determining a frequency of occurrence of the significant word within the second set of unstructured comments; and generating a visualization on the graphical user interface, the visualization including a portion of the identified significant words of the second set of unstructured comments; wherein for each visualized significant word of the second set of unstructured comments, a first aspect of an appearance of the significant word is based on an extent to which the frequency of occurrence of the significant word in the second set of unstructured comments deviates from a frequency of occurrence of the significant word in the first set of unstructured comments.

BRIEF DESCRIPTION OF THE DRAWINGS

The present disclosure will become more fully understood from the detailed description and the accompanying drawings, wherein.

DETAILED DESCRIPTION

Figure 1:
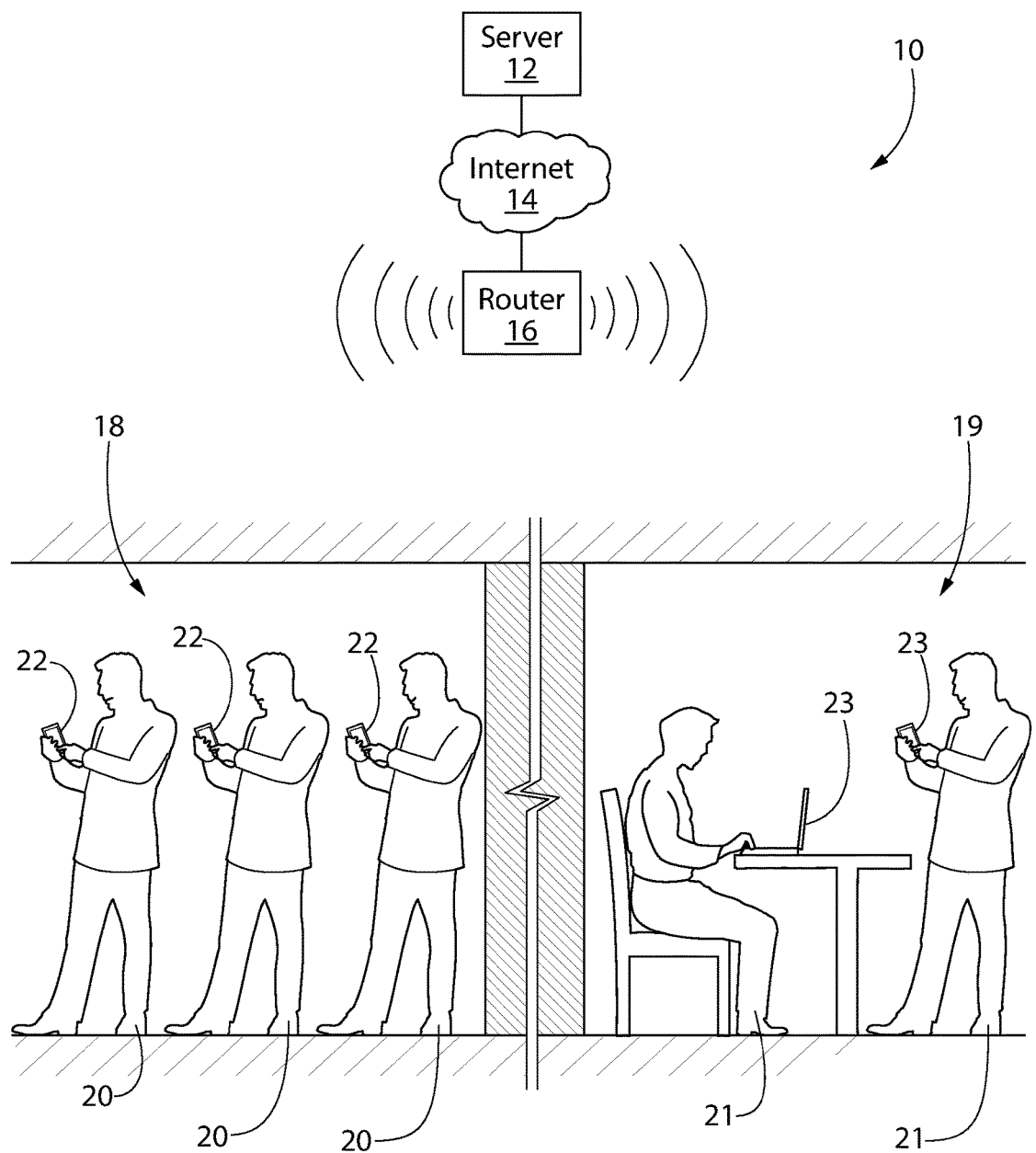
FIG. 1 is a block diagram of a system according to one embodiment.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. The discussion herein describes and illustrates some possible non-limiting combinations of features that may exist alone or in other combinations of features. Furthermore, as used herein, the term "or" is to be interpreted as a logical operator that results in true whenever one or more of its operands are true.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

The embodiments discussed herein can efficiently extract meaningful information from data under several conditions, such as the following: where there are a large number of responses to an unstructured question; where unstructured responses are each associated with a quantitative response to an evaluative structured question; and where there is value in comparing a population of the responses to another benchmark population of responses. For example, the system can compare the responses from one population to the responses from a benchmark population, identify significant words or noteworthy characteristics of the unstructured responses, and allow for indexing into the root unstructured responses that contributed to significant words noteworthy characteristics. As will also be discussed, in certain embodiments other discrete units of text can be assessed.

Referring now to the figures, FIG. 1 is a block diagram of a system 10 according to one embodiment. The exemplified system 10 includes a server 12 and router 16 connected to the internet 14, as well as first group respondent devices 22 and second group respondent devices 23. In the exemplified embodiment, the first group respondent devices 22 belong to first group respondents 20, that is, members of a first group 18 that have responded to a survey topic. A group can be any collection of originators of a comment or other discrete unit of text. A group need not be a person. In the exemplified embodiment, the first group provides benchmark data. In other embodiments, the first group can provide other data for comparison.

In the exemplified embodiment, the second group respondent devices 23 belong to second group respondents 21, that is, members of a second group 19 that have responded to a survey topic. The members of the first and second groups can be mutually exclusive. In other embodiments, the groups can have overlapping members or overlapping sources of discrete units of text. That is, a first set of unstructured comments can originate from first group commenters, a second set of unstructured comments can originate from second group commenters, and at least one commenter can belong to both the first group and the second group. In one embodiment, the first set of unstructured comments (or text) is received before the second set of unstructured comments (or text). But the invention is not so limited. For example, in another embodiment, the set of unstructured comments can be received at the same time or overlapping times.

The invention is not limited to survey responses. As will be discussed further herein, in other embodiments, the assessed text is not responses or comments to survey topics, but other discrete units of text, such as articles, websites, or books.

The server 12 (and other servers discussed herein) can be any computer or processor (or collection thereof) for carrying out programs in accordance with the functions described herein. In the exemplified embodiment, the server 12 communicates with the respondent manager devices 22, 23 through an internet connection, the router 16 providing wireless internet connection to the respondent devices 22, 23. In other embodiments, the server 12 can communicate with the respondent devices 22, 23 through any standard communication means, including through use of a telecommunication network (e.g., 3G or 4G) or a wired internet connection (e.g., wired Ethernet cables). In yet other embodiments, different sets of discrete units of text are obtained by alternative means.

In one embodiment, a system comprises a user interface and a server. The server is configured to perform the steps of receiving or providing reference data generated from a first set of unstructured comments from a first group; receiving a second set of unstructured comments from a second group, the second group being different from the first group; identifying a significant word within each unstructured comment of the second set of unstructured comments; for each significant word identified within the second set of unstructured comments, determining a frequency of occurrence of the significant word within the second set of unstructured comments; and generating a visualization on the graphical user interface, the visualization including a portion of the identified significant words of the second set of unstructured comments. As will be shown in later figures, for each visualized significant word of the second set of unstructured comments, a first aspect of an appearance of the significant word is based on an extent to which the frequency of occurrence of the significant word in the second set of unstructured comments deviates from a frequency of occurrence of the significant word in the first set of unstructured comments. Further, for each visualized significant word of the second set of unstructured comments, upon a user selecting the significant word from the graphical user interface, the visualization providing additional data regarding the significant word. This and related methods can be performed by a non-transitory computer-readable storage medium encoded with instructions executed on a processor.

Figure 2A:
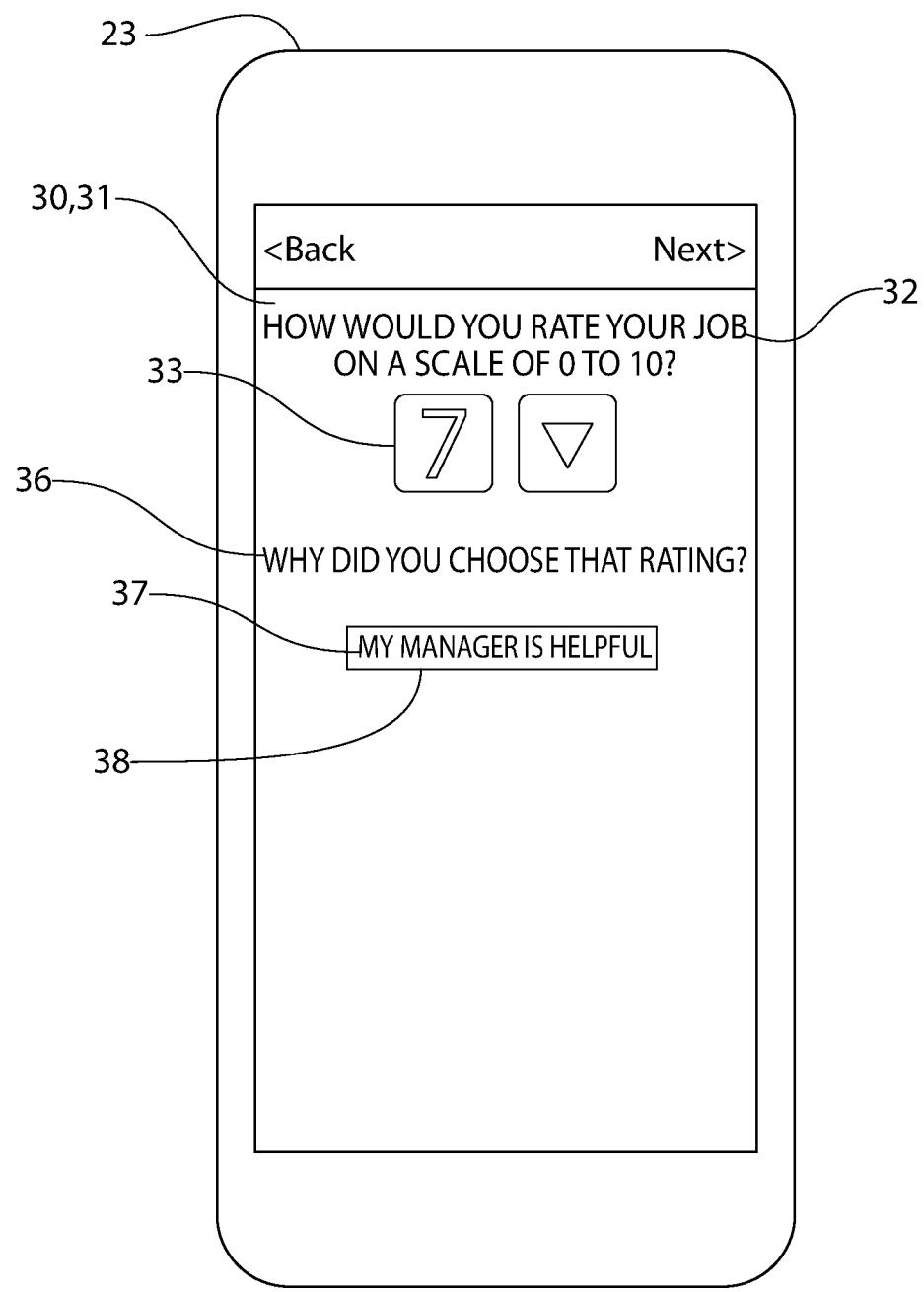
FIG. 2A is an image of a user interface of a respondent device according to one embodiment.

FIG. 2A is an image of a user interface of a respondent device according to one embodiment. In the exemplified embodiment, the respondent device 23 is a mobile smartphone. In other embodiments, the respondent device can be any computer device capable of carrying out programs in accordance with the functions described herein (including laptop computers, desktop computers, and tablets).

The user interface 31 of the respondent device 23 shows a first instance of a survey application 30. In the exemplified embodiment, the survey application 30 is a smartphone application. In other embodiments, the survey application 30 can be any program for carrying out the functions described herein. The respondent device 23 provides the respondent user interface 31. In the exemplified embodiment, the user interface 31 utilizes a touch screen provided by the smartphone. In other embodiments, the user interface can be any user interface capable of enabling a user to communicate with and carry out the functions described herein, including an interface utilizing a computer monitor, mouse, and/or keyboard.

In the exemplified embodiment, the respondent user interface 31 shows a structured survey topic 32, namely, "How would you rate your job on a scale of 1 to 10?" A structured topic can be any question or topic having a fixed number of predefined answers or responses. Such answers or responses can be referred to as a structured answer or response. In the exemplified embodiment, the respondent user interface 31 provides a drop down menu providing options for a structured response 33, though the option can be provided and selected in any number of ways. In the exemplified embodiment, the user chose a rating of 7 out of 10. In other embodiments, other structured topics and responses can be provided. In yet other embodiments, structured topics and responses can be omitted.

In the exemplified embodiment, the respondent user interface 31 also shows an unstructured survey topic 36, namely, "Why did you choose that rating?" The unstructured topic 36 can be any question or topic for which a respondent is not limited to a fixed number of predefined responses or comments, but can provide his or her own text comment or response (an unstructured comment). In the exemplified embodiment, the user provided an unstructured comment 37, namely, "My manager is helpful." For reasons that will be discussed below, the word "manager" can be considered a significant word 38 within the unstructured comment 57.

In the exemplified embodiment, the structured response 33 and unstructured comment 37 are responses to questions. In other embodiments, however, the structured response and/or unstructured comment can refer to any type comment or feedback. In yet other embodiments, any discrete unit of text can be analyzed, such as a website text, an article, an essay, or a book.

In the exemplified embodiment, the first instance of the survey application 30 is a computer program running on the respondent device 23. Other respondent devices can run other instances of the survey application. In yet other embodiments, topics or text can originate in other manners.

Figure 2B:
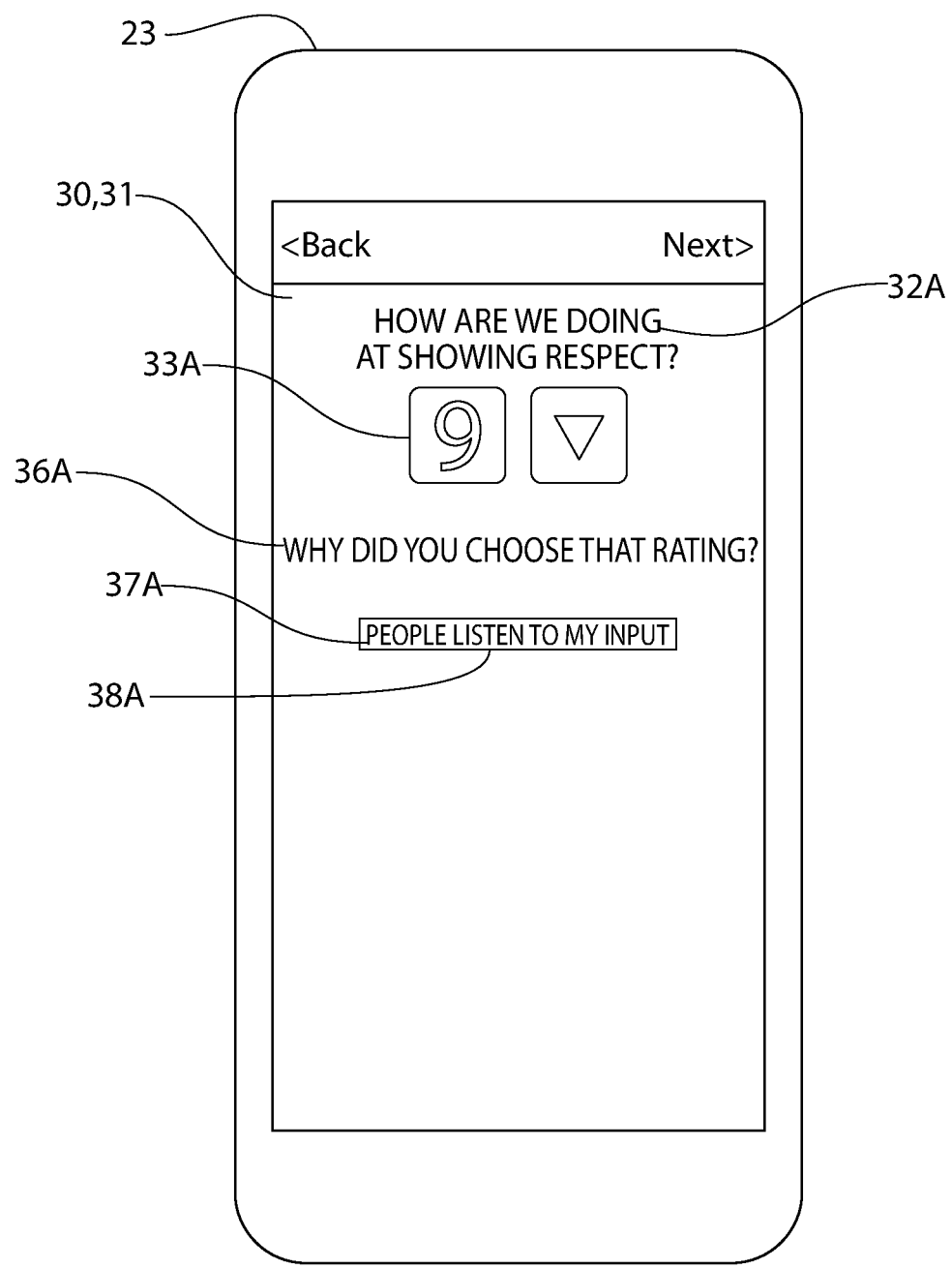
FIG. 2B is another image of a user interface of a respondent device according to one embodiment.

FIG. 2B is another image of the user interface 31 of the respondent device 23 according to one embodiment. Here, the topic 32A concerns a desired attribute, namely, respect. It is asked how the organization is performing regarding this attribute. The desired attribute can be any favorable characteristic or company core value. In other embodiments, other attributes can be used, such as communication or diversity. In the exemplified embodiment, the structured response "9" out of 10 is provided, indicating that the organization is performing favorably in promoting the desired attribute of respect.

In this example, the unstructured topic 36A once again asks why the structured response 33A was chosen. In this example, the user provides the unstructured response 37A "People listen to my input." For reasons that will be discussed below, the word "listen" can be considered a significant word 38A in this unstructured response 37A.

Figure 3C:
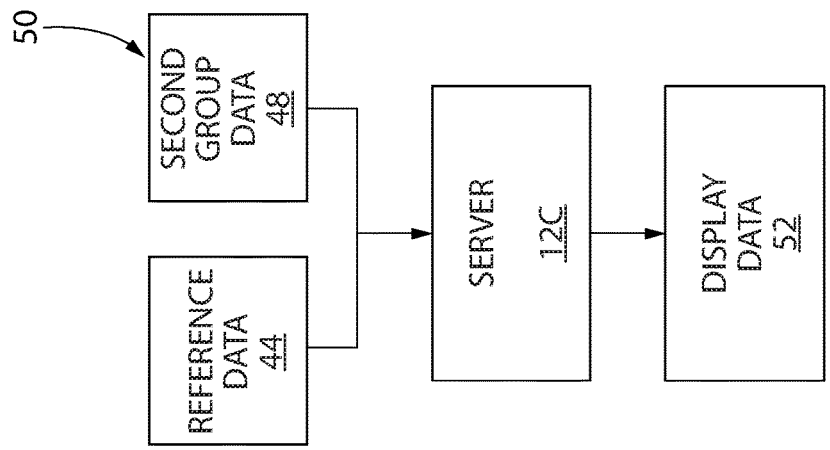
FIG. 3C is a flow chart of a process for generating display data according to one embodiment.
Figure 3B:
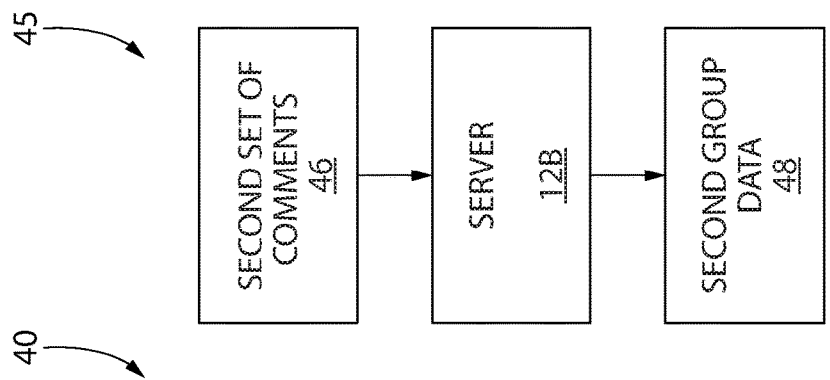
FIG. 3B is a flow chart of a process for generating second group data according to one embodiment.
Figure 3A:
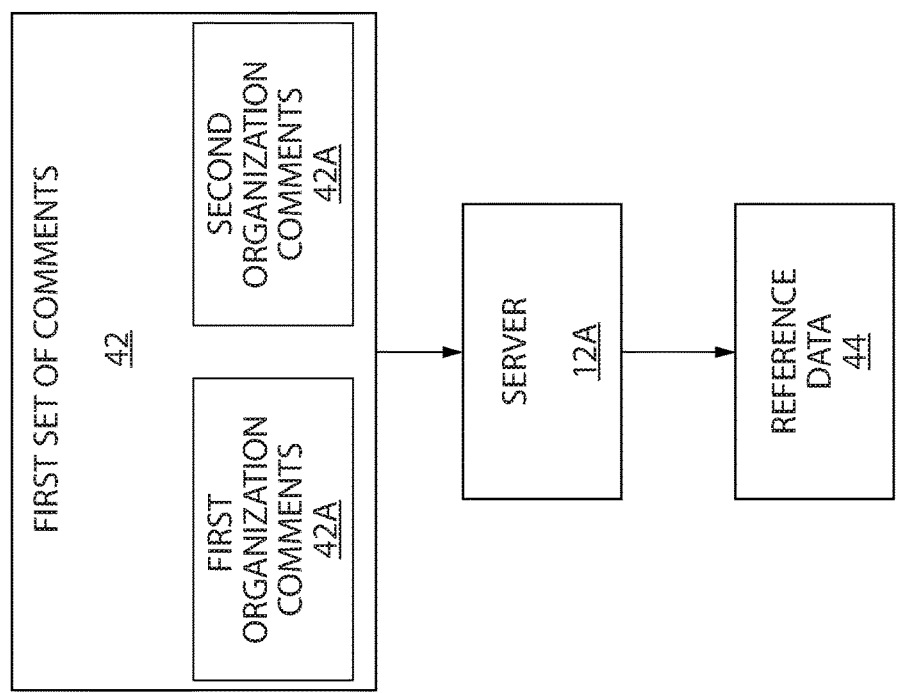
FIG. 3A is a flow chart of a process for generating reference data according to one embodiment.

FIG. 3A is a flow chart for a process 40 of generating reference data 44 according to one embodiment. In this embodiment, the reference data 44 is benchmark data generated from comments from a group comprising two different organizations. In other embodiments, reference data can be generated from any number of sources of discrete units of text (such as 1 or 10 sources).

In this embodiment, a first set of unstructured comments 42 comprises first organization unstructured comments 42A and second organization unstructured comments 42B. Those comments 42 are provided to a server 12A. The server 12A is configured to receive the comments 42 and process them.

The server 12A is programmed to identify the significant word within each of the unstructured comments of the first set of unstructured comments 42. A significant word can be any word or phrase in a comment or other discrete unit of text that has a noteworthy characteristic. For example, the word can have an unexpected frequency and/or an association with an outlying quantitative evaluation. As part of this process, text mining techniques can be used to parse each unstructured comment into its meaningful component words and phrases. Among other things, spelling corrections and the removal of words that do not add meaning (e.g., articles) can occur at this step. Further, each individual parsed word and phrase can be associated with any structured (e.g., quantitative) comment that was the associated with the unstructured comment that the word or phrase came from.

For each significant word identified within the unstructured comments 42, the process 40 can determine the frequency of occurrence of the significant word within the first set of unstructured comments 42. As used herein, the phrase "frequency of occurrence" can be any measure of frequency of the significant word as it relates to a set of unstructured comments (including the first or second unstructured comments). In the exemplified embodiment, the frequency of occurrence of the significant word in the first set of unstructured comments 42 is a percentage of the unstructured comments of the first set of unstructured comments where the significant word is present, and the frequency of occurrence of the significant word in the second set of unstructured comments (FIG. 3B) is a percentage of the unstructured comments of the second set of unstructured comments where the significant word is present. In another embodiment, the frequency of occurrence can be the number of occurrences of the significant word as compared to the number of total comments.

The reference data 44 generated by the server 12A can include data regarding the significant word and the frequency of occurrence. It can also include other data, such as data associating the significant word with its original unstructured comment, and data associating the original unstructured comment with an associated structured comment. It is also noted that the inventions are not limited to methods and systems that generate reference data. In other embodiments, the reference data can simply be provided to a server for comparison to a second set of unstructured comments or discrete units of text.

FIG. 3B is a flow chart for a process 45 of generating second group data 48 according to one embodiment. The process 45 can be similar to the process 40 discussed above with respect to FIG. 3A. The server 12B (which can be the same as or different from the server 12A used to generate the reference data) can receive a second set of unstructured comments 46 from a second group, such as an organization taking a survey. The second group is different from the first group in that the originators of the comments or text being compared are not identical. The server 12B can be programmed to identify a significant word within each unstructured comment of the second set of unstructured comments 46. For each significant word identified within the second set of unstructured comments 46, the server 12B can determine a frequency of occurrence of the significant word within the second set of unstructured comments 46.

The different options and alternative embodiments discussed above with respect to process 40 for generating reference data 44 can generally be applied to process 45 for generating second group data 48. For example, the second group data 48 can include the significant word data and the frequency of occurrence data, as well as data associating the significant word with its original unstructured comment, and data associating the original unstructured comment with an associated structured comment.

FIG. 3C is a flow chart for a process 50 of generating display data 52 according to one embodiment. In the exemplified embodiment, the server 12C (which can be the same and/or different from one or more of servers 12A, 12B) receives the reference data 44 and the second group data 48. The server 12C is programmed to process this data 44 and generate display data 52 based thereon. The display data 52 can be transmitted to a display device, and the display device can visualize an assessment of the unstructured comments based on the received display data 52. In the exemplified embodiment, the display device is a graphical user interface, and the visualized assessment includes a portion of the identified significant words of the second set of unstructured comments. The visualization will be discussed in more detail below.

In one example, once the significant words of the second set of unstructured comments are identified, for each significant word the server calculates its relative percentage compared to other words and phrases used in that population. This yields facts such as that the word "manager" appeared in 5.7% of the comments. Further, the server can calculate each significant word's summarized score using associated structured quantitative responses.

In another example, there could be a survey with two questions: (1) How would you rate your job on a scale of 0 to 10? (2) Why did you choose that rating? Example answers are provided in the table below:

| Rating (structured comment) | Explanation (unstructured comment) |
|---|---|
| 10 | "My manager is awesome" |
| 10 | "My work is really meaningful" |
| 7 | "My manager helps me out" |
| 6 | "Mostly because of my manager" |
| 6 | "I have the opportunity to be a manager someday" |
| 3 | "My manager is kind" |
| 2 | "I have a really long commute" |
| 1 | "We're going in the wrong direction" |

In this example, the word "manager" occurs in comments with the scores 10, 7, 6, 6, and 3. (The other scores are discarded for purposes of this calculation.) Averaged together, they yield 6.4, so the system can determine the word "manager" to have an average score of 6.4. There are many other summarization methods that could be used. These steps can be repeated for comments from a benchmark population.

From the set of significant words, a visualization can be created that depicts different determinations. For example, the visualization can depict how frequently the significant word appears in the analyzed population relative to how frequently it appears in the benchmarked population. For example, the size (a first aspect) of the significant words can differ, such that the larger the word, the more dramatic the difference between the analyzed population and the benchmarked population. One may also want to use two visualized groups: one for the significant words that appear more frequently than in the benchmark population (see, e.g., FIGS. 4 and 5), and one for significant words that appear less frequently than in the benchmark (see e.g., FIG. 6). The first group can contain only words that were used much more often in the analyzed population than in the benchmarked population. The larger the words are, the more dramatically frequent they are in the analyzed population than in the benchmark. The second group can contain only words that were used much less often in the analyzed population than in the benchmarked population. The larger the words are, the more dramatically less frequent they are in the analyzed population than in the benchmark.

Further, the visualization can depict where the significant word falls on a continuum between "positive" and "negative." In some cases, positive or negative will be defined as within the analyzed population. In other cases, it will make more sense to base whether something is positive or negative on how the significant word's score compares to the score for the significant word in the benchmark. A word's positive or negative (or neutral/mixed) position can be indicated on the visualization using color (a second aspect). For example, a positive word can be green, a negative word can be red, and a neutral word can be gray. The system can also perform more nuanced coloring. For example, instead of using one shade of red, the system can use a spectrum with bright red being more negative than dark red. The system can also use transparency or opacity to express something is expected based on the benchmark so that opaque words are unique to the company and more transparent (less opaque) words are common in the benchmark companies.

Referring back to the example score for "manager" discussed above, there are several ways to use this score to determine how to visualize the word, including its color. The visualization of "manager" can indicate whether the term is being used in a positive or negative way. Since the word "manager" had an average score of 6.4, the system might determine that "manager" is being used in a negative way on average. Alternatively, using benchmarking math, the system can determine whether or not the term is being used more positively or more negatively than the system might expect for that term based on the benchmarking reference data. For example, the system can determine that "manager" is being used more negatively at the analyzed company than at other similar companies. Example visualizations are discussed below.

Figure 4:
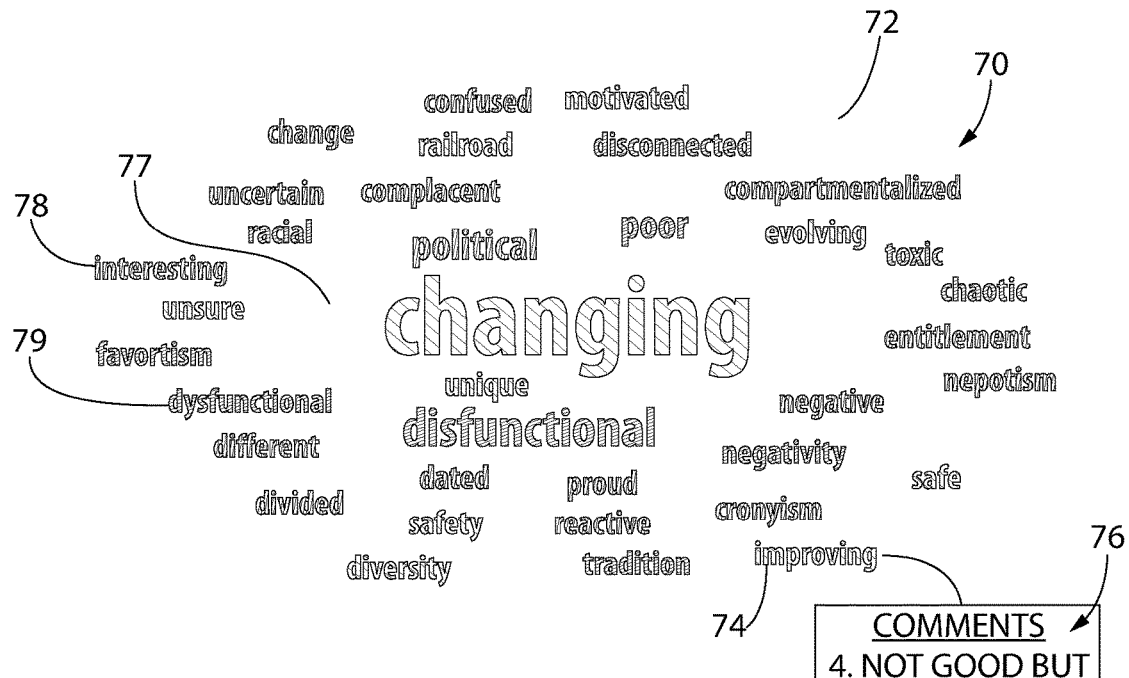
FIG. 4 is a first visualization according to one embodiment.

FIG. 4 is a first visualization 70 according to one embodiment. The visualization 70 appears on a graphical user interface 72. In other embodiments, the visualization can elsewhere, such as in printed form. The visualization 70 includes a portion of the identified significant words of the second set of unstructured comments (where a portion can be any number of the identified significant words, including one or all of the significant words). For each visualized significant word 74 of the second set of unstructured comments, a first aspect of an appearance of the significant word 74 can based on an extent to which the frequency of occurrence of the significant word 74 in the second set of unstructured comments deviates from a frequency of occurrence of the significant word in the first set of unstructured comments.

In the exemplified embodiment, the first aspect is size. The size of the visualized significant word increases the more the frequency of the significant word in the second set of unstructured comments exceeds the frequency of occurrence of the significant word in the first set of unstructured comments. In other embodiments, other aspects can be used.

In the exemplified embodiment, for each visualized significant word of the second set of unstructured comments, upon a user selecting the significant word from the graphical user interface, additional data regarding the significant word is displayed. In the exemplified embodiment, when the significant word 74 ("improving") is selected, the additional data displayed is the unstructured comments 76 of the second set of unstructured comments that include the significant word. Thus, every comment using the word "improving" or a similar word (e.g., "improvement") are included. In other embodiments, the additional data can be other (or additional) data, such as the total number of comments, the sources of the comments, and/or the dates of the comments.

Further, in the exemplified embodiment, the unstructured comments have an associated structured comment, which can affect a second aspect (e.g., color) of the appearance of the visualized significant word, and the second aspect can be based on the structured comments' deviation from reference/benchmark structured comments. The reference data includes a first score for each significant word within the first set of unstructured comments, the score based on the structured comments associated with the unstructured comments having the significant word. A second score is generated for each significant word within the second set of unstructured comments, the second score based on the structured comments associated with the unstructured comments having the significant word. The second aspect of the appearance of the significant word is based on the extent to which the second score deviates from the first score. Specifically, in this embodiment, the color of the significant word is based on the deviation. A first color 77 (e.g., green) indicates that the word is used more positively in the analyzed second set of unstructured comments than in the benchmark first set of unstructured comments. A second color 78 (e.g., gray) indicates that the word is used more similarly in the analyzed second set of unstructured comments and in the benchmark first set of unstructured comments. A third color 79 (e.g., red) indicates that the word is used more negatively in the analyzed second set of unstructured comments than in the benchmark first set of unstructured comments.

In another embodiment, an aspect of the appearance of the significant word can be based on pre-existing data associated with the commenters. For example, previous survey responses can indicate that a commenter is generally negative or positive. The color of the significant word can indicate whether the commenters using the displayed significant word are generally positive or negative. For example, a red word can indicate that the commenters using the word are generally negative, a green word can indicate that the commenters using the word are generally positive, and a gray word can indicate that the commenters are generally neither positive nor negative.

For example, a survey can ask the question, "What one word would you use to describe the culture at your company?" The system can then associate a respondent engagement score (a score indicative of how engaged the respondent is with the company, which can be based, for example, on responses to previous survey questions) with the respondent's word choice. The system can determine that the term "manager" is a word often used by disengaged people. This approach can help a company understand things like if the culture being "fast-paced" is a good thing or not for engaging employees in their work, and it can go either way depending on the personality types of the people the company hires. It also will sometimes lead to words generally thought as positive to be identified as negative. An example of this is the word "fun." Often, this word will show up as red, which indicates that perceiving a culture as fun can be counter intuitively disengaging, probably because people generally crave more meaning from their jobs, and fun is not enough. Another example is "diversity" showing up as green, but "diverse" showing up as gray, which is to say that, in the abstract, diversity sounds good, but when a workplace actually is diverse, things can be more challenging, and perhaps the employees at the company need training on working well with people who are different than they are. Oppositely, "innovative" will often show up as more engaging than "innovation" because, in the abstract, innovation is not very motivating, though actually being "innovative" is.

Figure 5:
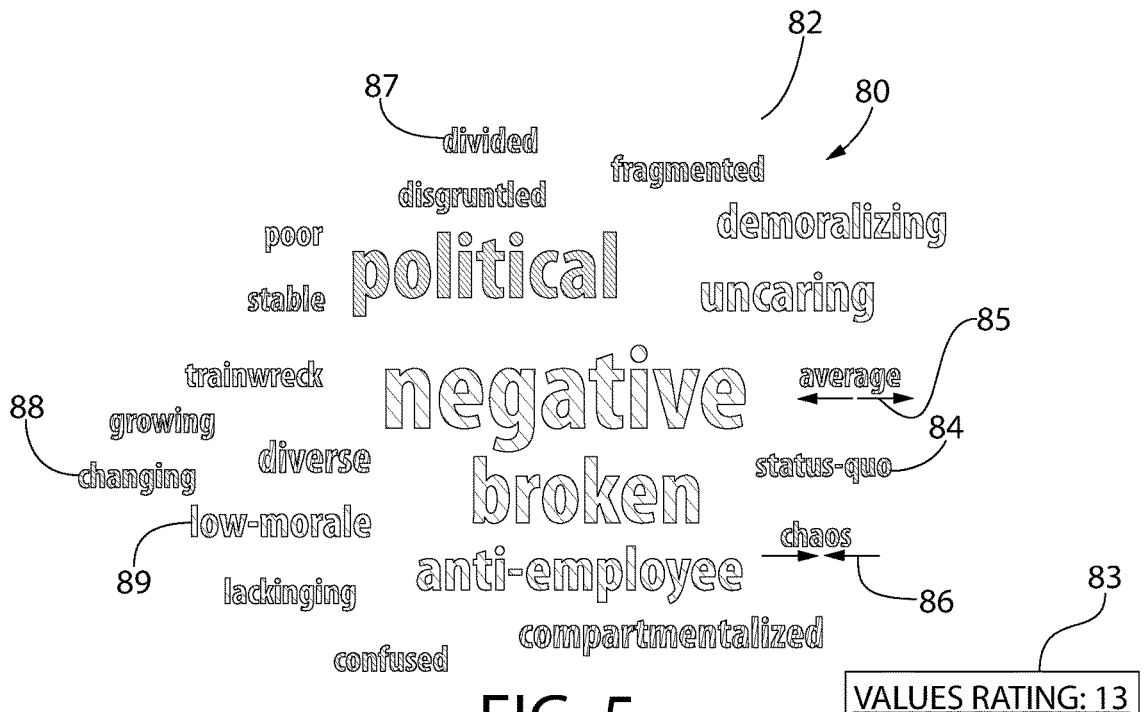
FIG. 5 is a second visualization according to one embodiment.

FIG. 5 is a second visualization 80 according to one embodiment. In this embodiment, there is a visualized significant word that is a phrase 84 ("status-quo"). Other phrases, such as those without a hyphen, can be considered significant words. Also displayed is a values rating 83 to indicate how the company is performing in promoting certain values. In this embodiment, a first set of desired attribute words is provided. Further, the system determines a set of most frequently occurring significant words based on the frequency of occurrence of the significant words within the second set of unstructured comments. Further, the system determines a values overlap, the values overlap being an extent to which the desired attribute words overlap with the most frequently occurring significant words. The values rating can be determined based on the values overlap. The values rating can be further based on values overlap data from one or more reference organizations. The visualization 80 further uses different colors 87-89 that are based on the frequency of occurrence of the visualized words. In the exemplified visualization 80, the values rating 83 is "13," indicating that the surveyed organization scored in the 13$^{th}$ percentile as compared to other organizations in achieving a values overlap. In other embodiments, the values rating can represent other values. For example, a values rating can reflect a score from "1" to "10," with a 10 indicating that there is a high degree of overlap between the desired attributes and identified significant words, and a 1 representing the opposite. In some embodiments, the values rating is based on the overlap as compared to overlap achieved by other organizations (or other sources of unstructured data), while in other embodiments, there is no comparison to other organizations (or other sources of unstructured data). Further, when comparisons are made to other organizations, the organizations can have the same desired attribute words or different desired attribute words.

The second visualization also includes a polarization indicator 85 and a coalescence indicator 86. In one embodiment, the polarization indicator 85 can indicate that the structured comments associated with a significant word are polarized. For example, in the earlier example, the word "manager" occurred in comments with scores of 10, 7, 6, 6, and 3. But if the word "manager" occurred in comments with scores of 10, 10, 9, 2, and 1, these responses could be considered polarized. That is, comments using the term manager either had very high ratings or very low ratings, but little (in this case nothing) in between. While the average of these responses (6.4) is unremarkable, the fact that respondents used the term manager so differently is noteworthy.

Polarized responses can be caused by many different factors. In this example, polarized responses can indicate that, whether positive or negative, people are passionate about the topic of their manager. Further, polarization can indicate that different types of respondents have different expectations of their manager.

In one embodiment, the coalescence indicator 86 can indicate that the structured comments associated with a significant word are the opposite of polarized, namely, coalesced. Returning to manager example, the manager comments can be considered coalesced if the associated ratings were 7, 6, 6, 5, and 5. In this case, comments using the word "manager" had similar, mid-range ratings. While the average of these ratings (5.8) is similar to the average (6.4) for the polarized responses, the fact that the ratings were so tightly packed within the mid-range is noteworthy. Coalescence can be caused by many different factors. For example, a high number of mid-range responses can indicate a lack of passion from the respondents when using the significant word.

In other embodiments, polarization and coalescence can be determined by other means. In some embodiments, the assessment of the distribution of responses (for determining polarization or coalescence) can be based on comparing the distribution to a benchmark. For example, benchmark date can indicate that most people using the word manager in a comment are providing a negative rating. Polarization can be indicated when the system determines that the high and low scores are more than expected (based on the benchmark data), and coalescence can be indicated when the high and low scores are less than expected (based on the benchmark data).

In the exemplified embodiment, the polarization indicator 85 and the coalescence indicator 86 are represented by outward pointing and inward pointing arrows. In other embodiments, other indicators can be used, such as other symbols or differing colors.

Figures 6, 7:
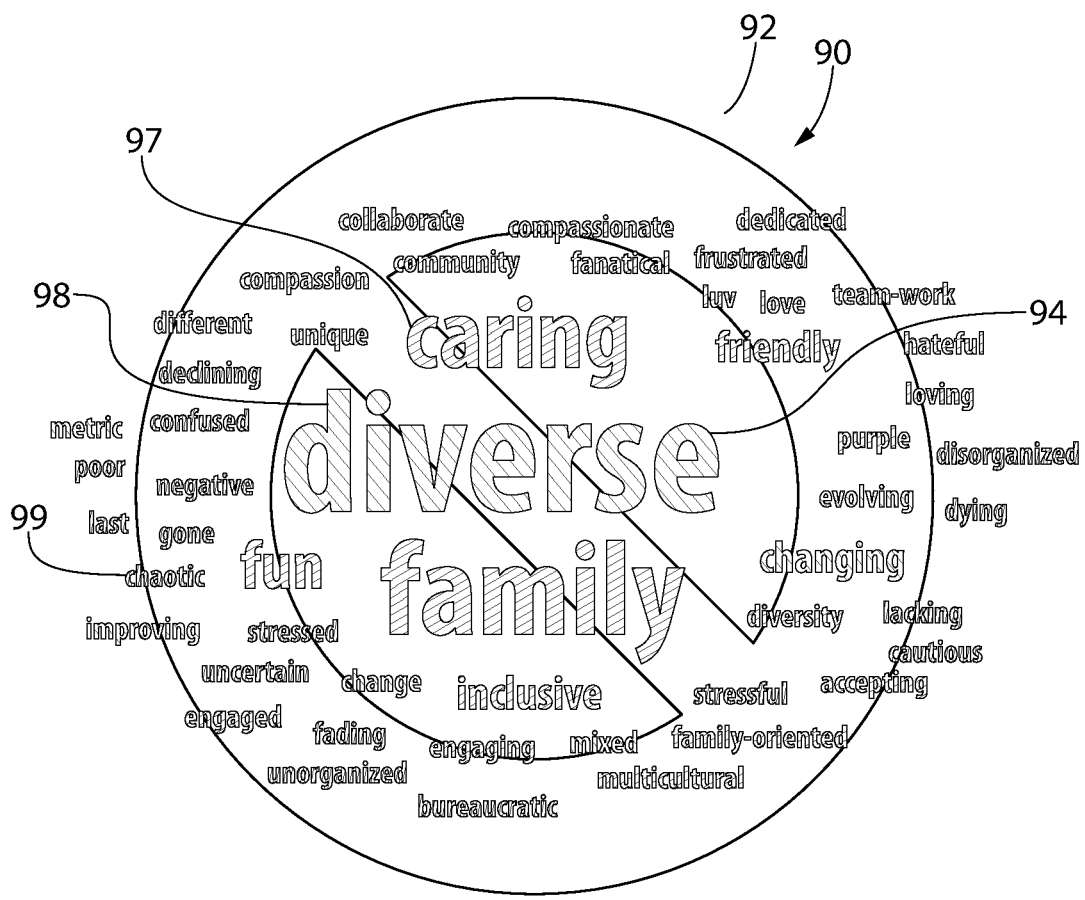
FIG. 6 is a third visualization according to one embodiment.
FIG. 7 shows a variety of aspects of a significant word according to different embodiments.

FIG. 6 is a third visualization 90 according to one embodiment. In this embodiment, the size of the significant word 94 increases the more the frequency of the significant word in the first set of unstructured comments exceeds the frequency of occurrence of the significant word in the second set of unstructured comments. In one example, the displayed words can be limited to those that were used much less often in the analyzed population than in the benchmarked population. The larger the words are, the more dramatically less frequent they are in the analyzed population than in the benchmark. Once again the visualized words can have different colors 97-99 based on a certain determination, such as a positive or negative association. Further, the possible alternative variations and embodiments discussed above with respect to the visualizations 70 and 80 can generally be applied to visualization 90.

It is noted that the embodiments discussed herein can be configured to adapt the visualization to new comments or texts as they arrive. For example, after generating the visualization, the method can receive additional unstructured comments from the second group, the additional unstructured comments forming part of the second set of unstructured comments to form a new second set of unstructured comments. The method can identify a significant word within each additional unstructured comment. For each significant word identified within the second set of unstructured comments, the method can determine a new frequency of occurrence of the significant word within the second set of unstructured comments. The method can generate a new visualization based on the new frequency of occurrence of each significant word within the second set of unstructured comments.

The invention can also be used to compare leader comments to non-leader or subordinate comments. In one embodiment, the first group can comprise leaders of an organization, and the second group can comprise non-leader members of the organization. The visualization can highlight the difference between leader and non-leader responses.

In another embodiment, the method can be used to compare how similar the leaders and subordinates were to another set of leaders and subordinates. For example, for each identified significant word of the second set of unstructured comments, the method can compare (a) the extent to which the frequency of occurrence of the significant word in the second set of unstructured comments (non-leaders) deviates from the frequency of occurrence of the significant word in the first set of unstructured comments (leaders) to (b) an extent to which a frequency of occurrence of the significant word in a fourth set of unstructured comments (reference non-leaders) deviates from a frequency of occurrence of the significant word in a third set of unstructured comments (reference leaders).

FIG. 7 shows a variety of aspects 100 of a significant word according to different embodiments. According to aspect 101, the significant words can vary according to opacity, with words varying from transparent (non-opaque) to opaque. According to aspect 102, the significant words can vary according to underline, with words varying from no underlining to one or more underlines. According to aspect 103, the significant words can vary according to boldness, with words varying from non-bold (standard font) to very bold (such that the thickness of the lines forming the letters becomes thicker). According to aspect 104, the significant words can vary according to italicization, with words varying from non-italicized to very italicized (with the letters be slanted at increasing degrees). In other embodiments, other aspects, such as size and color (discussed above) can be utilized.

As discussed above, in other embodiments, rather than assessing unstructured comments, other discrete units of text can be assessed, such as website text, articles, essays, or books. For example, a method of assessing discrete units of text can include providing reference data generated from a first set of discrete units of text from a first group; receiving a second set of discrete units of text from a second group, the second group being different from the first group; identifying a significant word within each discrete unit of text of the second set of unstructured comments; for each significant word identified within the second set of discrete units of text, determining a frequency of occurrence of the significant word within the second set of discrete units of text; and generating a visualization including each of the identified significant words of the second set of discrete units of text; wherein for each identified significant word of the second set of discrete units of text, a first aspect of an appearance of the significant word is based on an extent to which the frequency of occurrence of the significant word in the second set of discrete units of text deviates from the frequency of occurrence of the significant word in the first set of discrete units of text.

For example, text from news articles on a website can be assessed. In one embodiment, benchmark (reference) data can be generated from articles from a first news source. The analyzed news articles can be those of a second news source. A visualization can help the owners of the second news source understand, for example, what significant words they are using more frequently than the other (first) news source. In another embodiment, the discrete units of texts assessed could be article headlines, rather than the full text of the articles.

Figure 8:
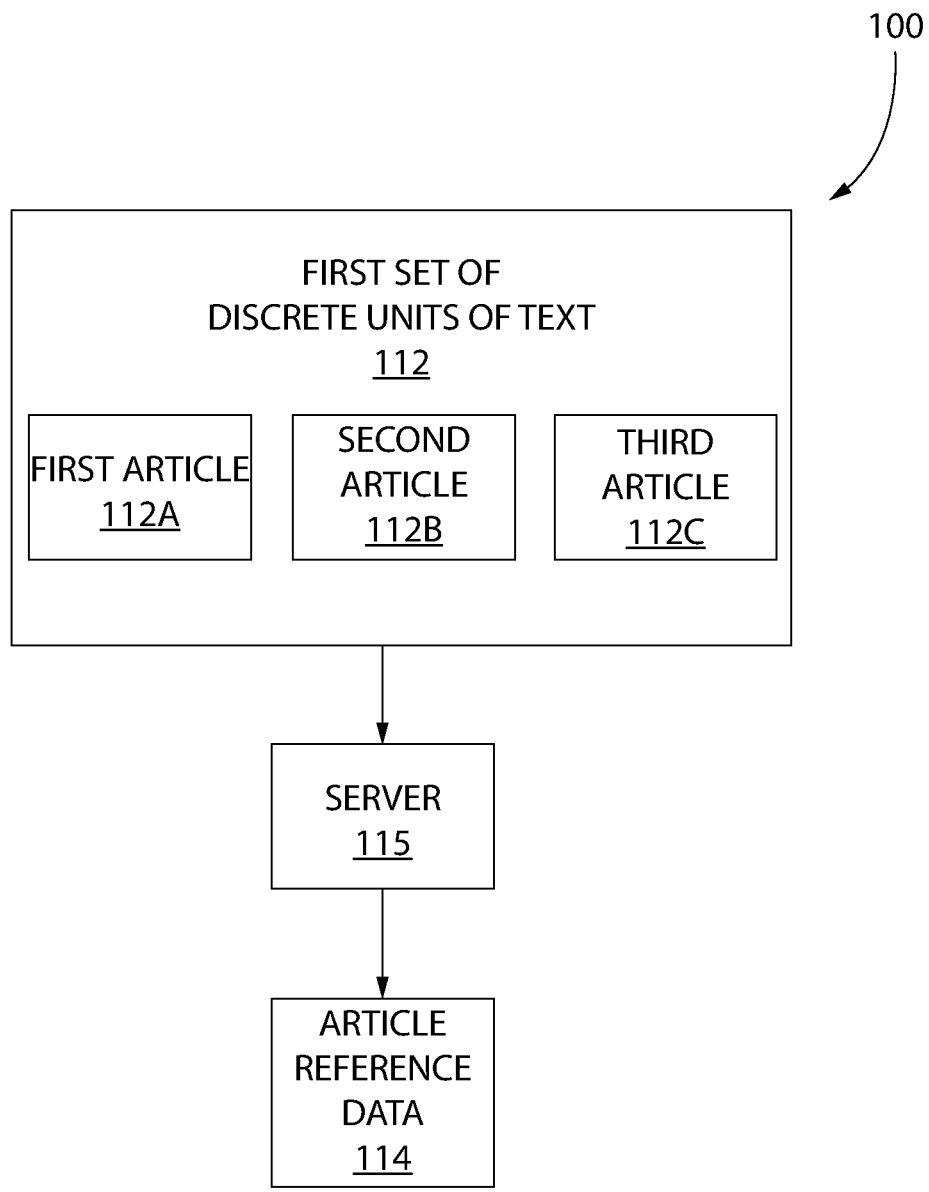
FIG. 8 is a flow chart of a process for generating article reference data according to another embodiment.

FIG. 8 is a flow chart of a process 100 for generating article reference data according to an embodiment for assessing articles. In this embodiment, the server 115 receives numerous articles 112A-112C that form the first set of discrete units of text 112. In other embodiments, articles can be replaced with other discrete units of text. The server 115 processes the first set of discrete units of text 112 and generates article reference data 114. Similar to the process shown in FIG. 3C, this data 114 can be used with second group data (which can also be generated from articles or other discrete units of text) to generate display data, and thereby generate a visualization. The visualization can have the different features discussed above with respect to other embodiments. Note that in this embodiment, a group (first or second) need not be a person, but can be any source of discrete units of text.

Figure 9:
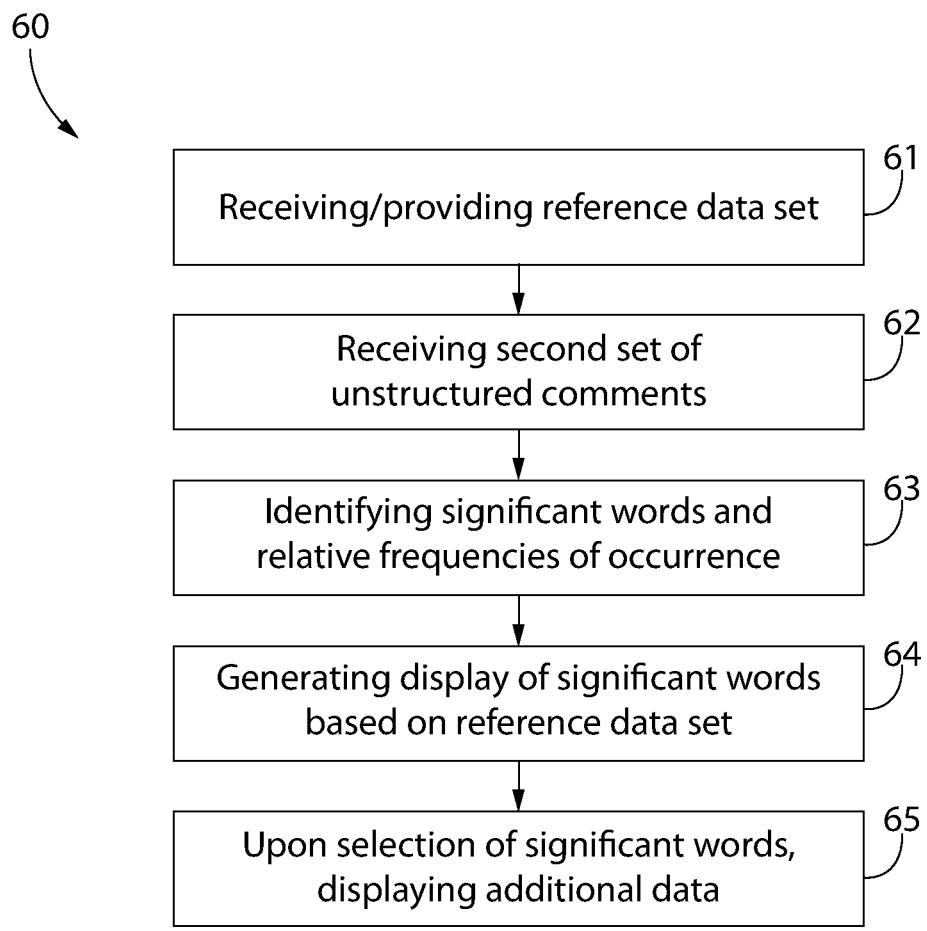
FIG. 9 is a flow chart for a method of assessing an unstructured comment according to one embodiment.

Returning to the assessment of unstructured comments, FIG. 9 is a flow chart for a method 60 of assessing unstructured comment according to one embodiment. In this embodiment, the method 60 includes providing reference data generated from a first set of unstructured comments from a first group (operation 61); receiving a second set of unstructured comments from a second group, the second group being different from the first group (operation 62); identifying a significant word within each unstructured comment of the second set of unstructured comments (operation 63); for each significant word identified within the second set of unstructured comments, determining a frequency of occurrence of the significant word within the second set of unstructured comments (operation 63); and generating a visualization on a graphical user interface (operation 64), the visualization including a portion of the identified significant words of the second set of unstructured comments, wherein for each visualized significant word of the second set of unstructured comments, a first aspect of an appearance of the significant word is based on an extent to which the frequency of occurrence of the significant word in the second set of unstructured comments deviates from a frequency of occurrence of the significant word in the first set of unstructured comments; and for each visualized significant word of the second set of unstructured comments, upon a user selecting the significant word from the graphical user interface, displaying additional data regarding the significant word (operation 65).

The embodiments discussed herein provide many advantages. They provide a method of assessing and interpreting large groups of comments or texts in an efficient manner. Further, they can enable the efficient comparison of text to benchmark or reference text. For example, a population can be compared to a similarly situated benchmark population from a variety of perspectives in a manner that a person can quickly and easily review and understand. Further, an interactive user interface can allow a user to obtain more information about the data behind the visualization in a convenient manner.

While the invention or inventions have been described with respect to specific examples, those skilled in the art will appreciate that there are numerous variations and permutations of the above described invention(s). It is to be understood that other embodiments may be utilized and structural and functional modifications may be made without departing from the scope of the present invention(s). Thus, the spirit and scope should be construed broadly as set forth in the appended claims.

What is claimed is:

1. A method of assessing unstructured comments, the method comprising:
providing reference data generated from a first set of unstructured comments from a first group;

receiving a second set of unstructured comments from a second group, the second group being different from the first group;

receiving an associated structured comment for each unstructured comment of the first group and the second group;

identifying a significant word within each unstructured comment of the second set of unstructured comments;

for each significant word identified within the second set of unstructured comments, determining a frequency of occurrence of the significant word within the second set of unstructured comments;

generating a visualization on a graphical user interface, the visualization including a portion of the identified significant words of the second set of unstructured comments, wherein for each visualized significant word of the second set of unstructured comments, a first aspect of an appearance of the significant word is based on an extent to which the frequency of occurrence of the significant word in the second set of unstructured comments deviates from a frequency of occurrence of the significant word in the first set of unstructured comments and a second aspect of the appearance of the visualized significant word is based on the associated structured comment for each unstructured comment of the first group and the second group; and for each visualized significant word of the second set of unstructured comments, upon a user selecting the significant word from the graphical user interface, displaying additional data regarding, the significant word.

2. The method of claim 1 wherein the additional data regarding the significant word comprise each unstructured comment of the second set of unstructured comments that includes the significant word.

3. The method of claim 1 wherein at least one of the significant words is a phrase.

4. The method of claim 1 wherein the unstructured comments of the first set and the second set are responses to a question.

5. The method of claim 1 wherein the first aspect is size.

6. The method of claim 5 wherein the size of the visualized significant word increases the more the frequency of the significant word in the second set of unstructured comments exceeds the frequency of occurrence of the significant word in the first set of unstructured comments.

7. The method of claim 5 wherein the size of the visualized significant word increases the more the frequency of the significant word in the first set of unstructured comments exceeds the frequency of occurrence of the significant word in the second set of unstructured comments.

8. The method of claim 1 wherein the first aspect is one of opacity, color, underling, bolding, and italicization.

9. The method of claim 1 wherein:
the frequency of occurrence of the significant word in the first set of unstructured comments is a percentage of the unstructured comments of the first set of unstructured comments where the significant word is present; and
the frequency of occurrence of the significant word in the second set of unstructured comments is a percentage of the unstructured comments of the second set of unstructured comments where the significant word is present.

10. The method of claim 1 wherein the reference data is provided by:
receiving the first set of unstructured comments from the first group;
identifying the significant word within each unstructured comment of the first set of unstructured comments;
for each significant word identified within the first set of unstructured comments, determining the frequency of occurrence of the significant word within the first set of unstructured comments.

11. The method of claim 1 wherein the first group comprises a plurality of organizations.

12. The method of claim 1 wherein the second aspect is color.

13. The method, of claim 1 wherein:
the reference data includes a first score for each significant word within the first set of unstructured comments, the score based on the structured comments associated with the unstructured comments having the significant word;
a second score is generated for each significant word within the second set of unstructured comments, the second score based on the structured comments associated with the unstructured comments having the significant word; and
the second aspect of the appearance of the significant word is based on the extent to which the second score deviates from the first score.

14. The method of claim 1 wherein the second aspect of the appearance of the visualized significant words are based on pre-existing data associated with commenters, the commenters having originated the unstructured comments that include the visualized significant words.

15. The method of claim 14 wherein the second aspect is a color, and the pre-existing data indicates whether the respective commenters are generally positive or negative.

16. The method of claim 1 wherein the first set of unstructured comments originate from first group commenters, the second set of unstructured comments originate from second group commenters, and at least one commenter belongs to both the first group and the second group.

17. The method of claim 1 further comprising;
after generating the visualization, receiving additional unstructured comments from the second group, the additional unstructured comments forming part of the second set of unstructured comments to form a new second set of unstructured comments;
identifying a significant word within each additional unstructured comment;
for each significant word identified within the second set of unstructured comments, determining a new frequency of occurrence of the significant word within the second set of unstructured comments;
generating a new visualization based on the new frequency of occurrence of each significant word within the second set of unstructured comments.

18. The method of claim 1 wherein the visualization further includes a polarization indicator or a coalescence indicator associated with one of the visualized significant words.

19. The method of claim 1 wherein the unstructured comments of the first set and the second set are responses to a question regarding a desired attribute of the organization.

20. The method of claim 1 wherein the first group comprises leaders of art organization, and the second group comprises non-leader members of the organization.

21. The method of claim 20 further comprising, for each identified significant word of the second set of unstructured comments, comparing:
(a) the extent to which the frequency of occurrence of the significant word in the second set of unstructured comments deviates from the frequency of occurrence of the significant word in the first set of unstructured comments to (b) an extent to which a frequency of occurrence of the significant word in a fourth set of unstructured comments deviates from a frequency of occurrence of the significant word in a third set of unstructured comments.

22. The method of claim 1 further comprising:
providing a first set of desired attribute words;
determining a set of most frequently occurring significant words based on the frequency of occurrence of the significant words within the second set of unstructured comments; and
determining a values overlap, the values overlap being an extent to which the desired attribute words overlap with the most frequently occurring significant words; and
determining a values rating based on the values overlap;
wherein the visualization includes the values rating.

23. The method of claim 22 wherein the values rating is further based on a values overlap data of at least one reference organization.

24. The method of claim 1 wherein the method is performed by a non-transitory computer-readable storage medium encoded with instructions executed on a processor.

25. A system for displaying unstructured comments, the system comprising:
a user interface;
a server configured to perform the steps of:
receiving reference data generated from a first set of unstructured comments from a first group;
receiving a second set of unstructured comments from a second group, the second group being different from the first group;
receiving an associated structured comment for each unstructured comment of the first group and the second group;
identifying a significant word within each unstructured comment of the second set of unstructured comments;
for each significant word identified within the second set of unstructured comments, determining a frequency of occurrence of the significant word within the second set of unstructured comments; and
generating a visualization on the graphical user interface, the visualization including a portion of the identified significant words of the second set of unstructured comments;
wherein for each visualized significant word of the second set of unstructured comments, a first aspect of an appearance of the significant word is based on an extent to which the frequency of occurrence of the significant word in the second set of unstructured comments deviates from a frequency of occurrence of the significant word in the first set of unstructured comments and a second aspect of the appearance of the visualized significant word is based on the associated structured comment for each unstructured comment of the first group and the second group.

26. The system of claim 25 wherein, for each visualized significant word of the second set of unstructured comments, upon a user selecting the significant word from the graphical user interface, the visualization providing additional data regarding the significant word.

27. A method of assessing unstructured comments, the method comprising:
providing reference data generated from a first set of unstructured comments from a first group;
receiving a second set of unstructured comments from a second group, the second group being different from the first group;
identifying a significant word within each unstructured comment of the second set of unstructured comments;
for each significant word identified within the second set of unstructured comments, determining a frequency of occurrence of the significant word within the second set of unstructured comments; and
generating a visualization on a graphical user interface, the visualization displaying of the identified significant words only a determined subset of the significant words;
wherein the displayed subset of the significant words is determined based on, for each significant word of the second set of unstructured comments, an extent to which the frequency of occurrence the significant word deviates from a frequency of occurrence of the significant word in the first set of unstructured comments; and
wherein a color of each of the displayed significant words of the subset is based on a structured comment associated with the unstructured comment from which the significant word was identified.

28. The method of claim 27 wherein the unstructured comments of the first set and the second set are responses to a question.

* * * * *